(12) United States Patent  (10) Patent No.: US 8,176,249 B2
Grynberg  (45) Date of Patent: May 8, 2012

(54) METHODS FOR EMBEDDING SESSION SECRETS, WITHIN APPLICATION INSTANCES

(76) Inventor: Amiram Grynberg, Neve Efrayim Monoson (IL)

( * ) Notice: Subject to any disclaimer, the term of this patent is extended or adjusted under 35 U.S.C. 154(b) by 1409 days.

(21) Appl. No.: 11/692,928

(22) Filed: Apr. 28, 2007

(65) Prior Publication Data

US 2007/0288763 A1 Dec. 13, 2007

Related U.S. Application Data

(60) Provisional application No. 60/767,531, filed on May 21, 2006.

(51) Int. Cl.
*G06F 13/00* (2006.01)
*G06F 13/28* (2006.01)

(52) U.S. Cl. ........ 711/115; 380/277; 711/100; 711/103; 713/165; 713/166; 713/167; 713/170; 713/171; 713/176; 713/190; 713/191; 713/192; 713/193; 713/194; 726/1; 726/2; 726/4; 726/6; 726/26; 726/30; 726/34

(58) Field of Classification Search .................... 713/176
See application file for complete search history.

(56) References Cited

U.S. PATENT DOCUMENTS

| | | | |
|---|---|---|---|
| 6,880,083 B1 * | 4/2005 | Korn | 713/170 |
| 7,054,443 B1 * | 5/2006 | Jakubowski et al. | 380/28 |
| 2002/0166051 A1 * | 11/2002 | Moser | 713/182 |
| 2002/0174071 A1 * | 11/2002 | Boudou et al. | 705/41 |
| 2003/0093643 A1 * | 5/2003 | Britt, Jr. | 711/170 |
| 2003/0196085 A1 * | 10/2003 | Lampson et al. | 713/156 |
| 2003/0233564 A1 * | 12/2003 | LaRose et al. | 713/193 |
| 2005/0091491 A1 * | 4/2005 | Lee et al. | 713/167 |
| 2006/0156036 A1 * | 7/2006 | Oh et al. | 713/193 |
| 2007/0033327 A1 * | 2/2007 | Sinclair | 711/103 |
| 2007/0271472 A1 * | 11/2007 | Grynberg | 713/193 |

* cited by examiner

*Primary Examiner* — Nathan Flynn
*Assistant Examiner* — Bryan Wright

(57) ABSTRACT

Method for embedding a session secret, within an application instance, comprising the steps of generating an ephemeral session secret by a master application. Embedding, by master application, secret bytes, within application bytes of a slave application. Calculating said ephemeral session secret, by slave application, from said embedded secret bytes, when slave application is executed.

9 Claims, 1 Drawing Sheet

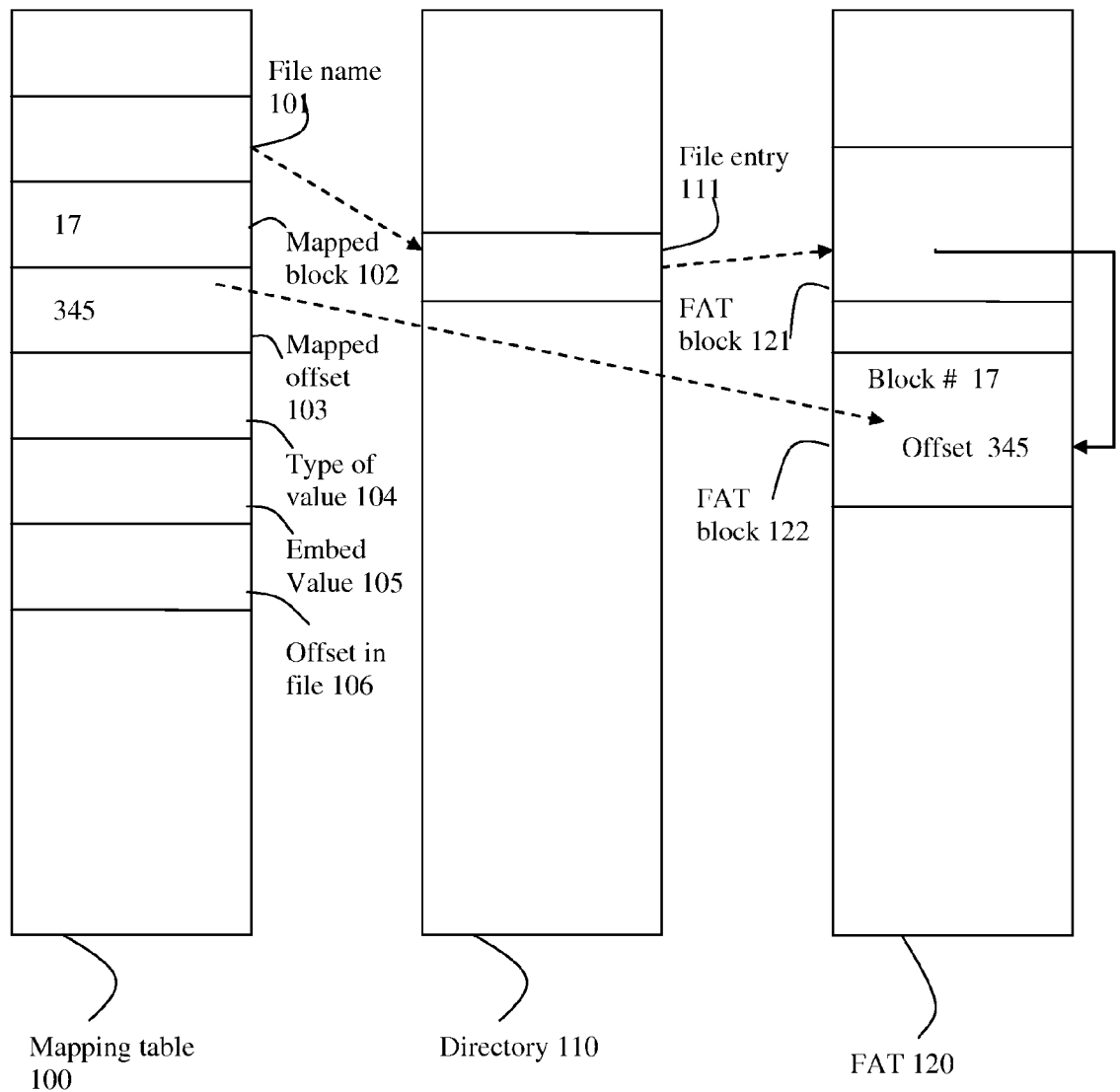

METHODS FOR EMBEDDING SESSION SECRETS, WITHIN APPLICATION INSTANCES

CROSS REFERENCE TO RELATED APPLICATIONS

Provisional Application Ser. No. 60/767,531 May 21, 2006, the benefit of which is hereby claimed under 35 U.S.C. .sctn. 119 (e), and wherein said provisional application is further incorporated herein by reference.

BACKGROUND OF THE INVENTION

Most security measure of applications, installed over an operating system (OS) in a desktop or server environment, are based on a security store protected by the OS.

However, there is a need for applications to be able to store secrets within the application and not to rely on external secrets store like.

Such use cases are found when applications are not permanently installed on a computer, or when such applications need to authenticate themselves to other applications executing on the same platform or elsewhere.

One such example is when an application is loaded from a portable storage device. A DRM application, for example, needs access to protected content securely stored on the portable device. Or it needs access to encrypted content wherein the key to decrypt such content is securely stored within the portable device.

Such an application needs to prove to the secure storage device that it is a legitimate application and not a rogue application trying to get hold of such protected content.

There are many other use cases wherein an instance of an executing application needs to prove to another executing application that it is a legitimate application.

Generally speaking, an application may need to use a secret shared with another. Or, it may need to use a private key to establish its identity to that application. In both cases, it needs to use a 'secret' accessible to the application.

Such secrets must be hidden within the application, because the nature of the use case is such that it cannot rely on the OS to guard that secret. This is especially true, when the application is executing on a non trusted host.

One known solution is to use a secret known only to a user who operates the application. This solution is not valid in use cases where the user is not trusted (DRM and software copy protection). Furthermore, even if a user is trusted, the host on which an application is executing may not be trusted.

Take the case of an internet café, wherein a spyware program may capture a password using a key-logger program.

A second possible solution, of hiding a secret within the storage of an operating system, is not satisfactory as it is not possible with non trusted hosts.

A third possible solution is to embed a secret within an executable code comprising an application or within a data file accessible to said application.

However, such embedded secrets are easy to find out, if all copies of the same program use the same embedded secret to facilitate authentication. Then, if a single copy of the application is breached and the secret found, then all copies of that application lose their protection.

An improvement of the third solution could be to embed a different secret in each copy of an application. Such a solution is not a good one either. A comparison program, could detect the location of the store secret where two copies of the same application differ from each other. Thus, extracting the secret from any instance and embedding it into another.

Furthermore, implementing such a scheme is more costly, since, devices which contain the application cannot be produced en mass from a single image, as each device would have to store a different copy of the program or an associated file.

Thus, it becomes apparent, that it would be advantageous if we could find a method that would provide for embedding a secret within an application instance in such a manner as to make retrieval and re-use of such a secret non practical for an attacker.

SUMMARY OF THE INVENTION

The present invention is based on the concept of embedding and hiding a secret within an application by making said secret an ephemeral secret, whose life time equals the duration of the application session.

Thus, each time an instance of an application is read and executed; a new secret is generated and embedded within said application.

At least one of the participating applications must assume the role of a Master Application. The other applications assume a Slave Application role or a Slave/Master role.

A Master Application generates a session secret and embeds it within a slave application.

A Master and Slave can share the same host or they can operate in two different hosts of which the one hosting the Master is a smart storage device storing a file image of the Slave.

DEFINITIONS

Application Session: The period from the invocation of an application until it terminates.

Master Application: Generates a session secret and embeds it as secret bytes within a slave application.

Slave Application: Retrieves embedded secret bytes and calculates a session secret.

Session secret: An ephemeral secret which is valid only for the duration of a session.

SSD: A Smart Storage Device capable of translating a block request to file and offset request or, vice versa.

Application bytes: A set of binary data together comprising an application. This set includes both executable and non executable parts of the application.

Secret bytes: A set of information bytes which collectively serve to derive a secret from. Secret bytes may be the actual value bytes of a secret, or code bytes, used to calculate such value. Secret bytes may include noise bytes (see below).

Code bytes: A set of instructions which when executed facilitate the creation of a secret. Such bytes can be machine instructions or interpreted commands.

Noise bytes: A set of information bytes, the purpose of which is to help in hiding the where about of secret bytes.

Data bytes: That part of an application which is not executable.

Executable bytes: That part of an application which is executable.

Signature bytes: A set of binary data, some times used to digitally sign at least part of the contents of application bytes. Such signature is usually embedded within the executable part of an application.

Embedding script: Information needed by a Master Application for carrying out an embedding of secret bytes into a Slave Application.

DRAWINGS

FIG. 1 illustrates the mapping performed by SSD during an embedding process.

DETAILED DESCRIPTION

The present invention is based on the concept of embedding and hiding a secret within an application by making said secret an ephemeral secret, whose life time equals the duration of the application session.

Thus, each time an instance of an application is read and executed; a new secret is generated and embedded within said application.

At least one of the participating applications must assume the role of a Master Application. The other applications assume a Slave Application role or a Slave/Master role.

A Master Application generates a session secret and embeds it within a slave application.

A Slave Application retrieves a hidden secret embedded by a Master Application.

A Slave/Master application may behave like a slave for one master and become a master to another slave.

In a first use case, a Master Application and a Slave Application rely on a session secret to authenticate the slave to the master.

In a second use case, a Master Application embeds a session secret in two Slave Applications and terminates. The two slaves then authenticate to each other using said session secret.

In a third use case, a Master Application generates a session secret. It uses that secret to derive an encryption key and encrypt a file. It then embeds the session secret in a Slave Application and terminates. The Slave application uses the session secret to decrypt the file.

It should be apparent, that there are many more use cases, but, the concept can be derived from the examples cited above.

Participating applications may run (execute) on the same host or they may run on different hosts.

When a Master Application and a Slave Application run on the same host, the Master Application embeds the session secret within the Slave Application by embedding secret bytes within an image of said slave application.

Same Hosts.

Thus, in accordance with a first preferred embodiment of the present invention, a Master Application first loads an image of a Slave Application from storage.

It then retrieves an embedding script and follows the script instruction to embed secret bytes within the image of the loaded Slave Application. The Slave Application then receives control and starts executing. At some point, it retrieves the embedded secret bytes and recreates the session secret.

This process is mostly straight forward. Please see the section describing Different Hosts for more details related to embedding secret bytes.

Different Hosts—Embeding Secret Bytes.

When a Master Application and a Slave Application run on different hosts, the Master Application will run on the same host (first host) where the files constituting all or part of the persistent image of the Slave Application are stored.

A possible example, for the first host, would be a portable storage device, storing the files constituting and application (or parts thereof), wherein, said Master Application is executed by the controller of the device.

Alternatively, the first host could be a file or storage server, local or remote.

To execute a Slave application, an OS of the second host reads one or more files making that application, from the first host. The second host then builds an image in memory and runs the Slave Application.

When a file is read from the first host by a second host, the Master Application intervenes in the read requests and embeds secret bytes within data blocks that are being read—on the fly.

A file is usually read by requesting binary blocks of data from a storage device. On the other hand, embedding scripts are usually specified as offsets into application files. Thus, the various implementations of said first host must be capable of translating file offsets into block number and block offset (or the reverse).

We will name all such first hosts as "Smart Storage Devices" or in short SSD.

When a SSD is a fileserver, this capability is built in. However, for FAT storage devices wherein the OS of the Slave Application is responsible for managing such mappings of a file to storage blocks, a non-smart controller is not capable of delivering such functionality.

A FAT based storage device must be enhanced to facilitate mapping of file names and offsets to block locations and offsets.

In accordance with a preferred embodiment of the present invention, a FAT storage device is modified to include such mapping capabilities and become a SSD. Thus, it must be able to understand the FAT format stored on the device and translate a file name to a list of blocks.

When an embedding script is received by a SSD (possibly as a file), the SSD reads the contents of the embedding script and it retrieves at least a name of an application file to be modified. It then follows the FAT and folder entries to create a table, mapping each offset value of the embedding script into block, offset and value.

FIG. 1 illustrates this process 100 is a mapping table. Entry 101 is the file name. SSD searches the directory block to find the entry for the specified file name 111. It then follows the entry to the FAT entry 121.

The first entry of the embedding script specifies offset 106 of the file as the first location to embed a value 105 of type constant 104. However, the block number and the offset in the block are not known initially.

Thus SSD follows FAT entry 121 to entry 122 calculating the cumulative offset of the file. Once it finds out that first file offset 106 is within block 122, it write down the block number in 102 and the offset within the block in the block in 103.

The process continues until all offsets are mapped. The resulting table can be sorted by block number, or an index can be built, to facilitate faster search of block number when required later.

When a block is read, the SSD (Master Application) checks the block number against such mapping table and it retrieves an embedded value 105 where appropriate. Once retrieved, such embedded value replaces the value read from storage and the new value is included in the block being transferred to the second host.

An embedded value may be a constant value, a noise value or part of a set of ephemeral secret bytes calculated on the fly.

A noise byte is a random value.

A secret byte is calculated from an ephemeral secret generated for each session. A new ephemeral session secret is calculated by SSD when the first secret value is embedded. Once all values are embedded, a flag is set to signal that a new session secret must be generated for the next read operation.

This flag can be combined with a timeout counter to prevent secret changes which are too often.

When a Slave Application file is modified, or moved, the SSD, recalculates its mapping table to reflect that change. It can do so as it detects changes to the folder entry that starts the file allocation chain.

The above is just one possible implementation and is presented here to prove the feasibility of the present invention. However, those skilled in the art will appreciate that other implementations can be derived from this basic concept.

Some application files are digitally signed to guaranty their integrity. When a file is modified by an SSD during a read operation, its signature becomes invalid. Thus, a SSD has three options: To remove the signature, to re-sign the modified stream with the original key, to remove the old signature and sign with a new key related to the SSD.

When SSD has access to the original key, then the second option is preferred. However, in most cases this is not practical. Thus, using SSD's own key to sign the application is a second best. To that end, each SSD should possess a certificate (and associated private key) signed by a Certificate Authority (Or, a known manufacturer of the SSD).

The signature process requires SSD to calculate the location of the signature in block/offset format. Then it needs to calculate the signature itself by reading all blocks of a file and performing the required signature algorithm.

Embedding Scripts.

An embedding script can take a form of a simple list of offsets, ranges and values pertaining to one or more files. It may be more involved, containing byte codes that would instruct a Master as to how to carry out such an embedding.

Whatever method is used, an embedding script provides the necessary instructions for embedding secret bytes within application bytes.

An embedding script must be communicated to the Master Application if it to be able to carry out its task.

In accordance with a preferred embodiment of the present invention, an embedding script is communicated as an encrypted file, wherein the key to decrypt that file, is communicated to the Master Application, encrypted by the public key of the that application.

If the Master Application runs on a SSD, said public key would usually be part of a device certificate issued by its manufacturer of the device. However, if the Master Application shares the same host as the Slave Application, then it should find a way to hide its private key. Thus, eventually, it would make sense for at least one Master Application to be stored on a SSD when multiple masters are involved.

Thus, in accordance with a preferred embodiment, the certificate of a SSD is communicated to a software publisher who in turn, encrypts the decryption key for the key needed to decrypt an embedding script and sends it back to the Master Application.

This arrangement provides for separation of the application itself which can be copied and distributed without limitation and the embedding script which can convert that application into a unique instance.

Yet, in another preferred embodiment, the embedding script is made part of the application. In such an embodiment, the embedding script of all distributed copies of the applications is encrypted by the same encryption key. Such a key is later sent from a publisher to a SSD, encrypted by the SSD public key, as disclosed above. This method makes it easier to manage but, somewhat less secure, as all copies of the script are protected by the same key.

What is claimed is:

1. A method for embedding a session secret, within an application instance, comprising the steps of:
   Generating ephemeral secret bytes by a master application executing on a Smart Storage Device;
   Associating an embedding script with a slave application, by said master application wherein a mapping table generated by said script is shared between said master application and said slave application but otherwise is not publicly known;
   Hiding said secret bytes, by embedding them within application bytes of said slave application while said application bytes are being read from said Smart Storage Device, by carrying out the instructions of said embedding script by said master application;
   Executing said application bytes of slave application on a host computing device and detecting said embedded secret bytes by said slave application through knowledge of said shared mapping table;
   Calculating an ephemeral session secret, by said slave application, from said embedded secret bytes, when said slave application is executing.

2. The method of claim 1 wherein the step of embedding, by master application, secret bytes within application bytes further comprises:
   Detecting by master application that a file block is being read from Smart Storage Device by an external host;
   Determining that an embedding script needs to modify that block;
   Carrying out embedding instructions, from embedding script, pertaining to said block thus modifying that block;
   Passing said modified block to said external host.

3. The method of claim 2 wherein the step of determining that an embedding script needs to modify that block further comprises:
   Looking up the requested block number in a mapping table prepared from said embedding script;
   Embedding said secret bytes in a byte offset specified by the script.

4. The method of claim 1 wherein:
   Master application is executing on a host computing device in lieu of a Smart Storage Device;
   Slave application is also executing on same host computing device;
   Master application loads an image of slave application and embeds said secret bytes within said image.

5. The method of claim 1 further including the step of updating of slave application's signature bytes to reflect said modifications when said slave application was already signed prior to embedding said secret bytes.

6. The method of claim 2 further including a preparation step of communicating to and securing by Smart Storage Device, an embedding script comprising the steps of:
   Encrypting an embedding script by a publisher using an encryption key;
   Encrypting said encryption key by Smart Storage Device's public key;
   Transferring encrypted script and encrypted key to Smart Storage Device.

7. The method of claim 6 wherein said public key is retrieved from a Smart Storage Device's Manufacturer Certificate communicated to publisher.

8. The method of claim 6 wherein said encrypted embedding script is itself embedded in a first master application by a second master application, using the steps of claim 1.

9. A method for sharing secret bytes between a master application and a slave application wherein a master application is executing on a first-computing host and a slave application is executing on a second computing host:

Hiding secret bytes by a master application, executing on said first computing host, within application bytes of a slave application, stored on said first computing host, by selectively embedding said secret bytes in offsets known to said master application and to said slave application, when said slave application is executing, but otherwise said offsets are not publicly known;

Delivering application bytes of said slave application by said first computing host to said second computing host;

Executing said application bytes of said slave application by said second computing host and retrieving said embedded secret bytes by said slave application.

* * * * *